(12) United States Patent
Le Creff et al.

(10) Patent No.: US 7,231,535 B2
(45) Date of Patent: Jun. 12, 2007

(54) ETHERNET CARD FOR CONNECTION TO A LOCAL NETWORK, FOR CONTROLLING CONNECTION TO A COMMUNICATION TERMINAL

(75) Inventors: Michel Le Creff, Vigny (FR); Raymond Gass, Bolsenheim (FR)

(73) Assignee: Alcatel, Paris (FR)

( * ) Notice: Subject to any disclaimer, the term of this patent is extended or adjusted under 35 U.S.C. 154(b) by 174 days.

(21) Appl. No.: 10/959,160

(22) Filed: Oct. 7, 2004

(65) Prior Publication Data
US 2005/0110618 A1    May 26, 2005

(30) Foreign Application Priority Data
Oct. 10, 2003   (FR) .................................. 03 11868

(51) Int. Cl.
*G06F 1/00*   (2006.01)
(52) U.S. Cl. ......................................... 713/340; 307/23
(58) Field of Classification Search ................. 307/23; 713/340
See application file for complete search history.

(56) References Cited

U.S. PATENT DOCUMENTS

| | | | |
|---|---|---|---|
| 5,687,387 A * | 11/1997 | Endejan et al. ................. 710/2 |
| 5,896,512 A * | 4/1999 | Einbinder et al. .......... 709/250 |
| 6,295,356 B1 * | 9/2001 | De Nicolo ................... 379/413 |
| 6,393,570 B1 * | 5/2002 | Henderson et al. ......... 713/310 |
| 6,396,391 B1 * | 5/2002 | Binder ................... 340/538.15 |
| 6,496,103 B1 | 12/2002 | Weiss et al. |
| 6,507,273 B1 * | 1/2003 | Chang et al. ................. 340/3.1 |
| 6,564,333 B1 * | 5/2003 | Ho et al. ..................... 713/340 |
| 6,587,454 B1 * | 7/2003 | Lamb ......................... 370/352 |
| 6,952,784 B1 * | 10/2005 | Miller ......................... 713/300 |
| 6,954,863 B2 * | 10/2005 | Mouton ...................... 713/300 |
| 7,088,819 B2 * | 8/2006 | Gass ........................... 379/413 |
| 2002/0002672 A1 | 1/2002 | Mouton |
| 2004/0073597 A1 * | 4/2004 | Caveney et al. ............ 709/200 |

FOREIGN PATENT DOCUMENTS

EP         0 724 208 A      7/1996
WO    WO 2004105317 A1 *   12/2004

OTHER PUBLICATIONS

IEEE 802/3af Power Interface Switch for Power Over Ethernet (PoE) Powered Devices, Texas Instruments, Aug. 2002.*
IEEE Std 802.3af -2003.*

* cited by examiner

*Primary Examiner*—Paul R. Myers
(74) *Attorney, Agent, or Firm*—Sughrue Mion, PLLC

(57) ABSTRACT

An Ethernet card (CL) is dedicated to the connection of a communication terminal (UE) to a local network via an Ethernet connection (CX). The terminal (UE) can be powered electrically by first power means (MAP), and includes a first internal bus (PCI1). The card (CL) includes i) second power means (MAA) capable of being powered remotely, via the Ethernet connection (CX), by power control means (PPP) on the local network, ii) a second bus (PCI2) coupled to the first internal bus (PCI1), iii) coupling means (MCP) coupled to the second bus (PCI2), and iv) control means (MCC) connected logically to the first (MAP) and second (MAA) power means and tasked, in the event of detection of remote powering of the card (CL) and the absence of electrical powering of the terminal (UE) by its first power means (MAP), to command the coupling means to electrically decouple the card from the first internal bus (PCI1), in order to allow its operation independently of the terminal (UE).

10 Claims, 2 Drawing Sheets

Figure 1:
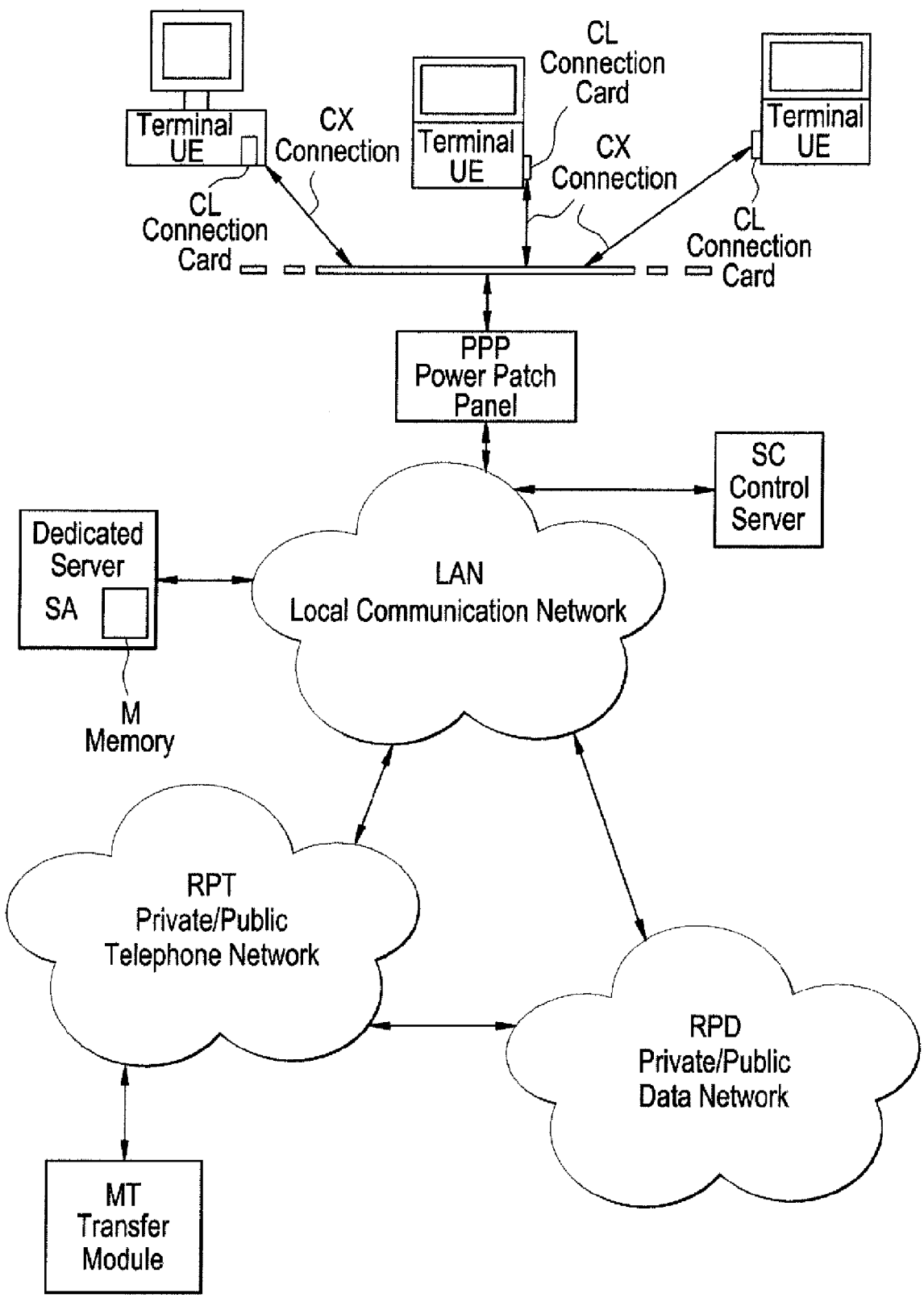

ETHERNET CARD FOR CONNECTION TO A LOCAL NETWORK, FOR CONTROLLING CONNECTION TO A COMMUNICATION TERMINAL

CROSS-REFERENCE TO RELATED APPLICATIONS

The invention concerns the area of local area networks (LAN), and more precisely the connection of communication terminals to such local networks, using connections of the Ethernet type.

Here, "communication terminal" refers to any communication equipment fitted with an Ethernet LAN connection card, either removable or built-in, allowing its connection to the LAN network, and possibly to a telephone network and/or an Internet protocol (IP) network, via an Ethernet connection. This can be a fixed or portable computer, for example, or a personal digital assistant (PDA).

Some communication terminals are fitted with software applications (or portions of software applications) which enable them to perform particular tasks. For example, certain computers possess at least part of a telephony application (possibly better known as a "software phone") which enables them to function as a telephone when they are fitted with a loudspeaker and a microphone.

In particular, these telephone terminals allow their users to gain access to emergency services, when they dial an emergency number such as 112 in Europe or 911 in the United States. Laws in force in certain countries require telephone terminals to communicate data which enable them to be located geographically when they use these emergency numbers.

In order to allow such automatic location, it has been proposed, particularly in document WO 03/071738, that Ethernet cards should be modified so that they can be powered remotely (in accordance with the IEEE 802.3af standard, for example) by power control devices (power patch panels) installed in the LAN network. A power patch panel (PPP) is an equipment element installed in a server or a switch of the LAN network for example, and including ports to which Ethernet connections are made and to which communication terminals can be connected. When a communication terminal is connected to the LAN network via a connection which in turn is connected to a power patch panel (PPP), the latter detects its signature (and therefore its power class) and assigns to the communication terminal an electrical power level which is a particular function of its signature.

This type of electrical power feed, known as a "phantom" power feed, theoretically enables the communication terminal to transmit data which represent it, such as its MAC address and/or its IP address for example, to a dedicated server in the LAN network, so that this dedicated server, or any other network equipment element to which it is coupled directly or indirectly, can deduce the location of the terminal from these data, from the port number of the power patch panel (PPP) to which the terminal is connected, and from a correspondence table.

Now in the case of a communication terminal of the software phone type, the Ethernet card is connected electrically by its own bus to the internal bus of the terminal. In other words, the Ethernet card is referenced to the same electrical potential (generally 0 volts, which is also logic 0) as the internal bus of the communication terminal. As a consequence, when the communication terminal is not connected to the mains supply, or when the mains supply is not working, or again when its battery is discharged, and when at the same time its Ethernet card is connected to the LAN network by an Ethernet connection, then the said Ethernet card cannot function correctly because it is sharing a common bus with the communication terminal which requires potentials close to logic zero on the bus. The invention therefore aims to remedy this drawback.

To this end, it proposes an Ethernet card that allows the connection, to a local network of the LAN type, of a communication terminal which includes a first internal bus and which is capable of being powered electrically by first power means (such as a transformer connected to the mains supply or a rechargeable battery for example), where this card is capable of being connected to the local network via an Ethernet connection and includes a second bus coupled to the first internal bus and second power means capable of being powered remotely, in phantom mode, via the Ethernet connection, by power control means of the local network.

This Ethernet connection card is characterized by the fact that it includes coupling means coupled to the second bus, and control means connected logically to the first and second power means and tasked, in the event of detection of the presence of a remote power source and the absence of a local power source, to order the coupling means to decouple (that is to isolate) the card electrically from the first internal bus, in order to allow the operation of the card independently of the terminal.

For example, the coupling means are implemented in the form of switching means capable of being set, at the command of the control means, either to a first state, in which they interrupt the electrical connection of the second bus to the first internal bus, or to a second state, in which they electrically connect the second bus to the first internal bus.

According to another characteristic of the invention, the card can include transfer means coupled logically to the second bus and tasked, firstly, to store data representing the identifier of a user of the terminal and/or at least one identifier of the terminal, and secondly, when the control means have detected that the card is being powered remotely by its second power means and that a location procedure has been triggered, to transmit at least some of the stored data to a dedicated server in the local network, with a view to determining the location of the terminal as a function of the port number of the power control means to which the terminal is connected, as well as additional data stored in a memory.

For example, the transfer means are tasked to trigger the location procedure when the card is powered remotely (in phantom mode) via the connection and its second power means.

The transfer means should preferably include a memory which is supplied with data from a telephony application installed at least partially in the communication terminal and coupled to the first internal bus.

In addition, the Ethernet connection card can also include power coupling means tasked, when the card is connected electrically to the Ethernet connection and in the event of detection by the control means of the absence of an electrical power feed from the terminal in which it is installed, to enable the electrical coupling of the second power means to the first power means so that the latter can be powered electrically.

In this case, the power coupling means can be tasked to determine the division, between the card and the terminal, of the electrical power made available to the terminal via the connection. The second power means are then arranged so as to transfer to the first power means, when so required, at least a part of the electrical power made available.

The internal bus of the communication terminal can be coupled to a telephony application (at least partially installed in the said terminal), and the local network can be connected to a dedicated server associated with a telephony identifier. In this case, the power coupling means can be arranged so as to allow the terminal to use part of the power made available via the Ethernet connection so that its telephony application can establish a telephone connection, via the Ethernet card, to the dedicated server.

The invention is particularly well suited, though non-exclusively, to connection cards of the PCMCIA and PCI type.

Figure 2:
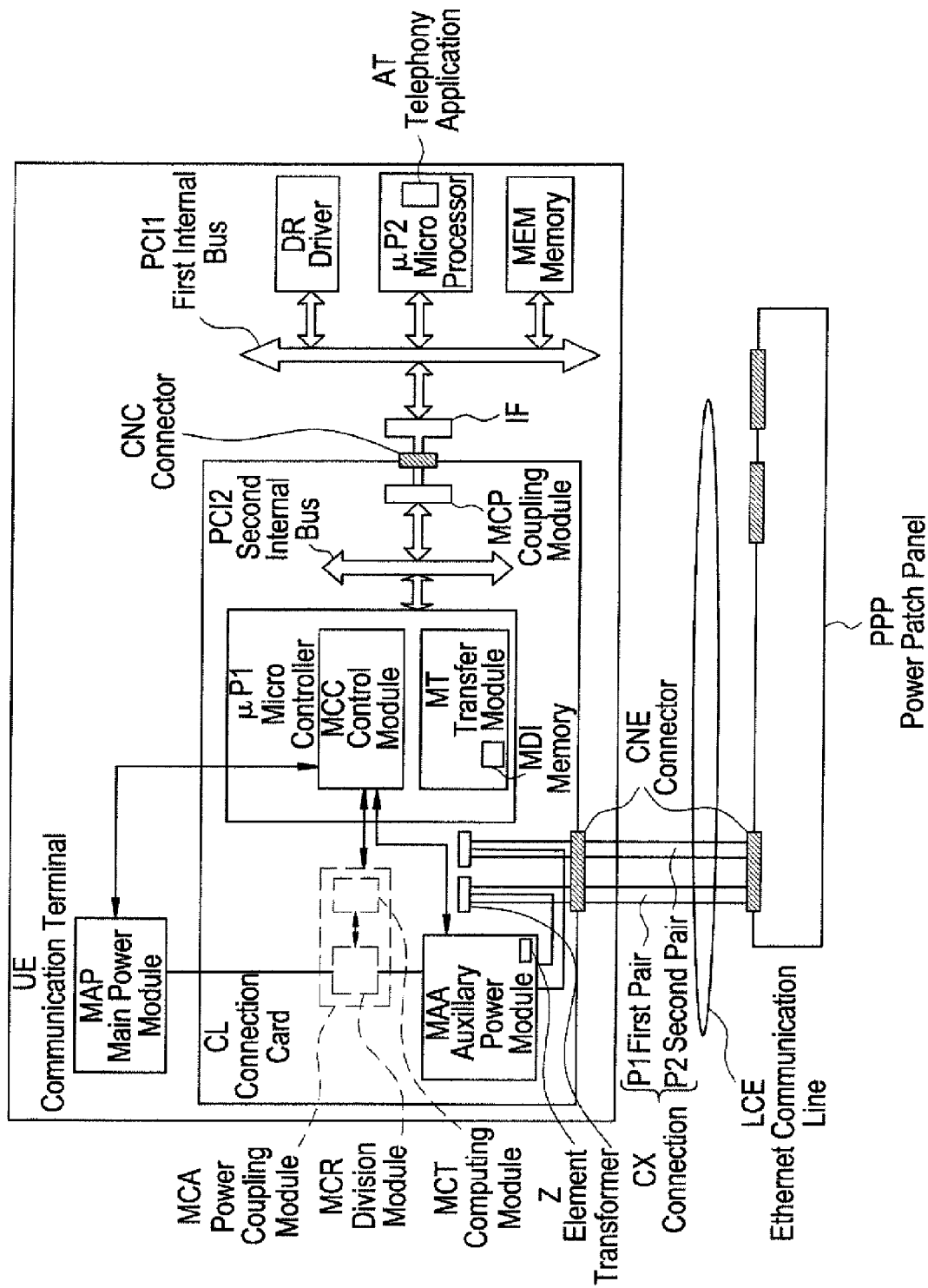

Other characteristics and advantages of the invention will appear on examination of the following detailed description, and of the appended drawings, in which:

FIG. 1 schematically illustrates an example of a communication installation which includes a local network of the LAN type coupled to a telephone network and a data network, and FIG. 2 schematically illustrates an example of the implementation of a connection card according to the invention, installed in a computer and connected to a connection of the Ethernet type.

The appended drawings can not only serve to complete the invention, but also to contribute to its specification, as appropriate.

The purpose of the invention is to allow at least the partial operation of an Ethernet card coupled to a communication terminal and connected to a local communication network, particularly in the absence of the main electrical power feed to the said communication terminal.

We refer firstly to FIG. 1 in order to describe a communication installation in which the invention can be used.

The communication installation illustrated by way of an example includes a local communication network (LAN), belonging to at least one company, such as a private and/or public data network (RPD) and a private and/or public telephone network (RPT), which can belong to a telephony operator, possibly of the mobile type.

Here, the local network (LAN) is of the "Local Area Network" type. Though it is not shown, it is connected to the telephone network (RPT) and to the data network (RPD) by means of network equipment such as access servers which generally include firewalls.

In addition, the telephone network (RPT) can be of the switched telephone network (RTC) type, or the public switched telephone network (PSTN) type, for example, but it could also be a public network of the public land mobile network (PLMN) type, such as the GSM, GSM/GPRS and UMTS networks for example. In addition, the data network (RPD) can be an Internet protocol (IP) network for example.

Of course, the invention is not limited to these types of network only, or indeed to the number of networks chosen here. It is therefore possible for one or more local networks to exist with one or more telephone networks (RPT) and/or with one or more data networks (RPD).

The local network (LAN) possesses at least one Ethernet communication line (LCE) to which connections (CX) are made, one of whose ends is fitted with a connector (CNE), of the RJ45 type for example, which allows the connection of a communication terminal (UE) via an Ethernet LAN connection card (CL). These connectors (CNE) can be wall sockets for example, or sockets installed in communication terminal blocks.

As indicated in the introduction part, here a "communication terminal" refers to communication equipment fitted with an ethernet LAN connection card (CL), either of the removable or built-in type, and capable of being powered remotely, in accordance with the IEEE 802.3af standard and its future variants and extensions for example. It can be a fixed or portable computer for example, or a personal digital assistant (PDA).

In what follows, we consider that the communication terminals (UE) are computers.

Each computer (UE) possesses a main power module (or first power mean—MAP), capable of being powered by the mains supply and/or by a rechargeable battery.

This main power module (MAP) allows a computer (UE) to operate some of its software applications when it is supplied with power. Here, a "software application" refers to a computer program which enables a computer (UE) to perform one or more particular tasks using some of its means and some of its internal and/or external equipment. For example, a telephony application (or "software phone") allows a computer (UE) to function as a telephone, possibly of the IP type, when it is equipped with a loudspeaker and a microphone.

In what follows, we consider, by way of an illustrative example, that the computers (UE) are fitted with a telephony application (AT). As a consequence, the connection card (CL), which is installed or accommodated in a computer (UE), is adapted for telephony here. For example, it can be of the PCI type when the computer is fixed, or of the PCMCIA type when the computer is portable. Since these PCMCIA and PCI cards are well known to the skilled in the art, they will not be described in detail. It is simply recalled, as illustrated schematically in FIG. 2, that a PCMCIA or PCI (CL) card includes a PCI2 bus which is connected to an internal PCI1 bus of the computer (UE) in which it is installed, by means of a PCMCIA (or PCI) connector (CNC) and an interface (IF) composed of equipment such as drivers, of the transmission/reception type for example, providing for the connection of the two PCI1 and PCI2 busses. The PCI2 bus on the card (CL) is therefore coupled to the telephony application (AT) via the internal PCI1 bus, particularly in order to allow the establishment of telephone connections with the telephone network (RPT) and/or the data network (RPD).

By convention, the PCI1 bus is coupled to drivers (DR), to at least one microprocessor (μP2), in which the telephony application (AT) is preferably installed, and to at least one memory (MEM).

It is important to note that an application can be installed only partially in a computer (UE), the other part then being installed in one or more servers in the LAN network.

According to the invention, the computers (UE) are connected to the LAN network by means of power control equipment, or a "power patch panel" (PPP). More precisely, each power patch panel (PPP) is connected to the Ethernet communication line (LCE), to which Ethernet connections (CX) are also made by means of connectors (CNE), of the RJ45 type for example, so as to control the powering of the Ethernet connections (CX) in phantom mode.

A power patch panel (PPP) is, installed, for example, in a server or a switch of the LAN network and possesses ports to which Ethernet connections (CX) are made.

By convention, each Ethernet connection (CX) possesses several pairs of electrical cables, generally eight, two pairs being used in practice. The first pair used (P1) is generally set to a potential of 0 V, while the second pair used (P2) is generally set to a potential of −48 V. Each pair is connected at each of its ends to a center-tapped of transformer winding. In the power patch panel (PPP) the center point of pair P1 is, for example, connected to the 0 V potential and the center point of pair P2 is connected to the −48 V potential, while on the card (CL) each center point is connected to a single diode bridge. This arrangement constitutes what the professional engineer conventionally refers to as powering in "phantom mode".

In parallel with the diode bridge, upstream or downstream of the latter, an element (Z) of predetermined impedance is connected, representing the power class consumed on the Ethernet link (CLE) by the card (CL). This element, which can be a resistance, for example, constitutes the "signature" of the Ethernet card (CL). The diode bridge and the impedance element (Z) are installed here in an auxiliary power module (MAA).

When a computer (UE) is connected to the LAN network via an Ethernet connection (CX) made to a port of a power patch panel (PPP), the latter can immediately detect its presence. In fait, the power patch panel (PPP) detects the signature of the computer (UE), meaning the value of its impedance, and from this deduces its power class. The power patch panel (PPP) generally possesses a total electrical power which it can divide between the different computers (UE) connected to the Ethernet connections (CX) that it controls, in accordance with the needs of the moment and of their respective power classes.

Once it has determined the electrical power that it can make available to a computer (UE), the power patch panel (PPP) provides it with the appropriate electrical power via the Ethernet line (LCE) and its Ethernet connection (CX). The computer (UE) can then draw on this power at the level of the auxiliary power module (MAA) of its card (CL).

This type of electrical power feeding in phantom mode is well known to the professional engineer and will therefore not be described further.

It is important to note that the determination of the electrical power by the power patch panel (PPP) can be supervised by a control server (SC) of the LAN network.

The invention proposes to use this auxiliary powering system, made available to the computer (UE), and more precisely to its card (CL), to operate the said card (CL), possibly in addition to an on-board application (here the telephony application (AT)), including when the main power source of the computer (UE) is absent.

To this end, the Ethernet card (CL) includes firstly a coupling module (MCP) connected physically (and therefore electrically) to the PCI2 as well as to the PCMCIA (or PCI) connector (CNC). This coupling module (MCP) is preferably implemented in the form of a multi-way switch capable, on command, of adopting one of two different states—a first state, known as "non-conducting", in which it breaks the connection (or electrical coupling) of the PCI2 bus to internal PCI1 bus of the computer (UE), and a second state, known as "conducting", in which it connects (or electrically couples) the (second) PCI2 bus to the (first) internal PCI1 bus of the computer (UE).

The Ethernet card (CL) also includes a control module (MCC), incorporated into a micro-controller for example, and connected logically to the main power module (MAP) and to the auxiliary power module (MAA) in order to detect their respective powering states. This control module (MCC) is tasked, when it detects firstly that the card (CL) is powered remotely by its auxiliary power module (MAA), and secondly that the computer (UE) is not powered by its main power module (MAP), to command the coupling module (MCP) to adopt its first non-conducting state in order to electrically decouple (or isolate) the PCI2 bus from the internal PCI1 bus.

Since the PCI2 bus on the Ethernet card (CL) is no longer at the potential of the internal PCI1 bus of the computer (UE), it can therefore be placed at the potential to which the auxiliary power module (MAA) is set because it is being powered by the power patch panel (PPP) via connection CX. As a consequence, the Ethernet card (CL) is able to function independently of the computer (UE). As will be seen later, this in particular will allow it to transmit data which is intended to enable it to be located when the computer (UE) in which it is installed is not receiving power.

Of course when the control module (MCC) detects that the computer (UE) is powered by its main power module (MAP), it orders the coupling module (MCP) to adopt its second, conducting state in order to electrically couple (or connect) the PCI2 bus to internal PCI1 bus.

In order to allow its location, the Ethernet card (CL) includes, for example, a transfer module (MT) coupled logically to the PCI2 as well as to the control module (MCC). This transfer module (MT) is tasked to trigger a location procedure every time the control module (MCC) detects that the auxiliary power module (MAA) is being powered by the power patch panel (PPP) in phantom mode. This location procedure consists firstly of transmitting data representing an identifier of the user of the computer (UE) and/or at least one identifier of the said computer (UE), to a dedicated server (SA) of the LAN network via the Ethernet connection (CX).

The transfer modules (MT) and control modules (MCC) perform logical functions which can be included in one or more electronic components, such as a microprocessor (or micro-controller) (µC1) and the associated memory or memories.

The data intended for the dedicated server (SA) are preferably stored in a memory (MDI) of the transfer module (MT), which is updated by the telephony application (AT) either regularly or every time the computer (UE) is started up or shut down. For example, it can be the password of the user (or the "user-login") and/or the MAC address of the computer (UE) and/or its IP address. The data are preferably communicated to the telephony application (AT) by the user of the computer (UE).

The dedicated server (SA) is preferably arranged so as to itself locate the computers (UE) connected to the LAN network and to communicate the locations to a service terminal (TS)) which is, for example, connected to the telephone network (RPT), as illustrated, or indeed to the data network (RPD).

The location procedure is effected on the basis of the data received from the computer (UE), the port number of the power patch panel (PPP) to which the Ethernet connection (CX) used by the computer (UE) is connected, and (additional) data stored in a memory (M). These additional data can, for example, be arranged in the form of a table establishing the correspondence between port numbers and geographical locations (or location data representing particular places or zones). This table can also include, in correspondence with the additional data, telephony identifiers of service terminals (TS) associated with different services. As a consequence, once the dedicated server (SA) has determined the geographical location of the calling computer (UE), it can determine the telephony identifier of the service terminal (TS) to which it must transmit the location of the Ethernet card (CL) and/or the telephony identifier of this card and/or the identifier of its user.

On receipt of this information, a service terminal (TS) can then possibly attempt to establish a link to the computer (UE) in which the located Ethernet card (CL) is installed.

When the Ethernet card (CL) has been located, and its computer (UE) is not powered by its main power module (MAP), it can be arranged so as to transmit a message to the dedicated server (SA) indicating that the user of the computer (UE) cannot be contacted. In fact, it is unable to operate its software phone. This message can be accompanied by a call transfer instruction to a chosen telephone number or to a messaging service.

It is possible however, with the aid of the invention, to allow the communication terminal (UE) to operate some of its on-board applications, and particularly its software phone telephony application (AT), when it is not powered by its main power module (MAP).

It is important to note that the type of operation which is about to be described below can occur only on the condition that the communication terminal (UE) requires only low power in order to function (such as in the case of a PDA for example), or if it is capable of functioning in low-power mode in order to allow the use of a restricted number of applications, for example.

As shown by the dotted lines in FIG. 2, the Ethernet card (CL) can include a power coupling module (MCA), connected to its auxiliary power module (MAA), to the main power module (MAP) of the terminal (UE), and to the control module (MCC). This power-coupling module (MCA) is tasked, when it receives such a command from the control module (MCC), to physically couple the auxiliary power module (MAA) to the main power module (MAP) so that it can receive power.

Preferably, the power-coupling module (MCA) determines how the electrical power available at the level of the auxiliary power module (MAA) must be divided between the card (CL) and the computer (UE). Thus, the card (CL) and the computer (UE) can be powered remotely (in phantom mode,) via the Ethernet connection (CX) to which the said computer (UE) is momentarily connected.

In the embodiment illustrated in FIG. 2, the coupling module (MC) includes, firstly, a switching and division module (MCR) connected to the main power module (MAP) and to the auxiliary power module (MAA), and secondly, a computing module (MCT) tasked to calculate the division of power and to deliver division commands to the switching and division module (MCR).

When the switching and division module (MCR) receives these division commands, it determines the configuration that corresponds to it, and then it configures itself in order to transfer all or part of the electrical power, available at the level of the auxiliary power module (MAA), to the main power module (MAP). The computer (UE) can then use this power to operate an on-board application, such as the telephony application (software phone) (AT), for example.

With the aid of the invention, it is therefore possible to operate the telephony application (AT) of a communication terminal (UE) even when it is not powered by its main power means (mains supply or battery), but of course on condition that this computer (UE) is connected to the LAN network via an Ethernet connection (CX).

This is particularly advantageous, especially in the event of using emergency numbers, such as 112 in Europe or 911 in the United states for example. In fact, it is possible to envision situations in which a user has just connected his computer (UE) to an Ethernet connection (CX) of the LAN network and wishes to dial an emergency number but has not been able connect it to the mains supply or the battery is discharged, or where the mains supply is not working.

In this case, the connection of the computer (UE) to the Ethernet connection (CX) is detected by the power patch panel (PPP) which makes a certain amount of electrical power available to it, and this can be transferred, at least partially, at the level of the main power module (MAP), via the auxiliary power module (MAA). This power available at the main power module (MAP) can then be used by the computer (UE) to operate the telephony application (AT), in order, in this case, to allow the establishment of a telephone connection to a dedicated server (SA) of the LAN network. In the reverse direction, this can also allow a service terminal (TS), having received the location of an Ethernet card (CL) from the dedicated server (SA), to set up a telephone call to the communication terminal (UE), while the latter is not receiving power from its main power module (MAP).

It is important to note that the Ethernet card (CL) described above includes all its usual features, in particular allowing on-board applications of the communication terminal (UE), in which it is installed, to function when the main power module (MAP) is powered.

In addition, when the control module (MCC) detects that the communication terminal (UE) is powered by its main power module (MAP), and that the coupling module (MCP) is set to its second conducting state, it can order the transmission to the dedicated server (SA) of a message indicating that the user can again be contacted and/or requires the cancellation of a call transfer, for example.

The control module (MCC), the power coupling module MCA, and particularly its computing module (MCT), and the transfer module (MT), can be implemented in the form of electronic circuits, software (or computer) modules, or a combination of circuits and software.

The invention is not limited to the methods of implementation of Ethernet connection card and the communication terminal described above only by way of an example, but it also encompasses all of the variants that can be envisaged by the professional engineer in the context of the following claims.

Thus, in the foregoing, the subject is a communication terminal fitted with a loudspeaker and a microphone which allow it to function as a telephone with the aid of an on-board software application of the "software phone" type. However it is possible to envision the direct or indirect connection to the Ethernet card at least of the electroacoustic transducers, acting as a microphone and earphone (or loudspeaker), and incorporation of the software telephone application into the Ethernet card—into its processor for example. It is also possible to envision connection to the Ethernet card, via a wired or wireless link, an auxiliary equipment element which includes at least a microphone, an earphone, a telephone keypad, electronic circuits (designed to work with the microphone, the earphone and the keypad) and a processor associated with the electronic circuits and allowing exchanges with the Ethernet card. Such an equipment element can be what the professional engineer calls a "passive" or "dumb" telephone, for example.

The invention claimed is:

1. An Ethernet card for connection to a local network, for a communication terminal, where this terminal includes a first internal bus and first power means capable of powering this terminal from a local power source, where the said card includes:
   a second internal bus,
   coupling means, to couple the second internal bus to the first internal bus, and
   second power means capable of powering this card from a remote power source located in the said local network; characterized in that it also includes control means for the coupling means, where these control means are connected logically to the first and second power means, and arranged to command the said coupling means to electrically decouple the second internal bus from the first internal bus, so as to allow operation of the card independently of the said terminal in the event of detection of the presence of a remote power source and the absence of a local power source.

2. A card according to claim 1, characterized in that the said coupling means are switching means capable of being set, at the command of the said control means either to a first state in which they interrupt the electrical coupling of the said second bus to the said first internal bus or to a second state in which they electrically connect the said second internal bus to the said first internal bus.

3. A card according to claim 1, characterized in that it includes transfer means coupled logically to the said second internal bus and able to store data representing the identifier of a user of the said terminal and/or an identifier of the said terminal, and arranged to transmit at least some of the said data to a dedicated server of the said local network with a view to determining the location of the said terminal as a function at least of the said received data and of additional data stored in a memory, in the event of detecting the presence of a remote power source and the triggering of a location procedure.

4. A card according to claim 3, characterized in that the said transfer means are arranged to trigger the said location procedure in the event of detection of the presence of a remote power source by the said control means via the said connection and the said second power means.

5. A card according to claim 3, characterized in that the said transfer means include a memory capable of being supplied with data by a telephony application at least partially installed in the said terminal and coupled to the said first internal bus.

6. A card according to claim 1, characterized in that it includes power coupling means connected physically to the said first and second power means, and arranged to electrically power the terminal from the remote power source, in the event of electrical connection of the said card to the said connection and detection of the absence of a local power source by the said first power means.

7. A card according to claim 6, characterized in that the said power coupling means are arranged to determine a division of the electrical power, supplied by the power control means via the said connection, between the said card and the said terminal, and in that the said second power means are arranged to transfer to the said first power means at least a part of the said electrical power as a function of the said determined division.

8. A card according to claim 7, for a communication terminal including a first internal bus coupled to a telephony application at least partially installed in the said terminal, characterized in that the said power coupling means are arranged so as to allow the terminal to use part of the power made available via the said Ethernet connection so that the said telephony application can establish a telephone connection, via the Ethernet card, to a dedicated server connected to the local network.

9. A card according to claim 1, characterized in that it is arranged in the form of a card of the PCMCIA type for remote powering.

10. A card according to claim 1, characterized in that it is arranged in the form of a card of the PCI type for remote powering.

* * * * *